US009058353B2

(12) United States Patent
Muller et al.

(10) Patent No.: US 9,058,353 B2
(45) Date of Patent: Jun. 16, 2015

(54) COMPUTER RELATIONAL DATABASE METHOD AND SYSTEM HAVING ROLE BASED ACCESS CONTROL

(75) Inventors: Leslie Muller, London (GB); Michael Morris Wasser, Seattle, WA (US); Alberto Arias Maestro, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 312 days.

(21) Appl. No.: 13/635,300

(22) PCT Filed: Mar. 11, 2011

(86) PCT No.: PCT/US2011/028138
§ 371 (c)(1),
(2), (4) Date: Feb. 15, 2013

(87) PCT Pub. No.: WO2011/115839
PCT Pub. Date: Sep. 22, 2011

(65) Prior Publication Data
US 2013/0138666 A1 May 30, 2013

Related U.S. Application Data

(60) Provisional application No. 61/313,951, filed on Mar. 15, 2010.

(51) Int. Cl.
*G06F 17/30* (2006.01)
*G06F 21/62* (2013.01)

(52) U.S. Cl.
CPC ...... *G06F 17/30424* (2013.01); *G06F 17/3051* (2013.01); *G06F 17/30545* (2013.01); *G06F 21/6227* (2013.01)

(58) Field of Classification Search
None
See application file for complete search history.

(56) References Cited

U.S. PATENT DOCUMENTS

| 6,085,191 | A  | 7/2000  | Fisher et al.     |
| 6,374,252 | B1 | 4/2002  | Althoff et al.    |
| 6,820,082 | B1 | 11/2004 | Cook et al.       |
| 6,928,554 | B2 | 8/2005  | Dettinger et al.  |
| 6,985,904 | B1 | 1/2006  | Kaluskar et al.   |
| 7,054,877 | B2 | 5/2006  | Dettinger et al.  |
| 7,158,969 | B2 | 1/2007  | Dettinger et al.  |

(Continued)

FOREIGN PATENT DOCUMENTS

WO 95/31781 A1 11/1995

OTHER PUBLICATIONS

Notification of Transmittal of the International Search Report and the Written Opinion of the International Searching Authority, or the Declaration; International Search Report and Written Opinion for International Application No. PCT/US2011/020895, Oct. 21, 2011, 7 pgs.

(Continued)

*Primary Examiner* — Hung Q Pham

(57) ABSTRACT

A computer method, system and apparatus control access to secured data in a plurality of databases. A repository is coupled to the databases and has a security runtime subsystem. The repository intercepts a user query of a subject database in the plurality. The security runtime subsystem determines from the intercepted query a user and corresponding user role. Based on user role, the security runtime subsystem automatically modifies the user query to filter out secure data for which the identified user is unauthorized to access but are part of the user query.

16 Claims, 5 Drawing Sheets

(56) References Cited

U.S. PATENT DOCUMENTS

| | | | |
|---|---|---|---|
| 7,228,307 | B2 | 6/2007 | Dettinger et al. |
| 7,599,924 | B2 | 10/2009 | Dettinger et al. |
| 7,672,936 | B2 | 3/2010 | Dettinger et al. |
| 7,734,639 | B2 | 6/2010 | Dettinger et al. |
| 7,984,043 | B1 | 7/2011 | Waas |
| 8,027,971 | B2 | 9/2011 | Dettinger et al. |
| 8,214,325 | B2 | 7/2012 | Navas |
| 2003/0014394 | A1 | 1/2003 | Fujiwara et al. |
| 2004/0088561 | A1 | 5/2004 | Dettinger et al. |
| 2004/0103433 | A1 | 5/2004 | Regeard et al. |
| 2004/0254924 | A1 | 12/2004 | Dettinger et al. |
| 2005/0038783 | A1 | 2/2005 | Lei et al. |
| 2006/0026159 | A1 | 2/2006 | Dettinger et al. |
| 2006/0248592 | A1 | 11/2006 | Agrawal et al. |
| 2007/0130616 | A1 | 6/2007 | Ng et al. |
| 2007/0180490 | A1 | 8/2007 | Renzi et al. |
| 2007/0185853 | A1 | 8/2007 | Dettinger et al. |
| 2007/0288890 | A1 | 12/2007 | Wells |
| 2008/0189758 | A1 | 8/2008 | Akeel et al. |
| 2008/0284598 | A1 | 11/2008 | Shah |
| 2009/0006063 | A1 | 1/2009 | Sedukhin et al. |
| 2009/0006352 | A1 | 1/2009 | Dettinger et al. |
| 2009/0055838 | A1 | 2/2009 | Sedukhin et al. |
| 2009/0063490 | A1 * | 3/2009 | Fuerst et al. .................. 707/9 |
| 2009/0300002 | A1 | 12/2009 | Thomas et al. |
| 2010/0023498 | A1 | 1/2010 | Dettinger et al. |
| 2010/0030725 | A1 | 2/2010 | Mendis et al. |
| 2010/0125545 | A1 | 5/2010 | Navas |
| 2011/0302180 | A1 | 12/2011 | Muller et al. |
| 2011/0302200 | A1 | 12/2011 | Muller et al. |
| 2013/0144852 | A1 | 6/2013 | Muller et al. |

OTHER PUBLICATIONS

Notification of Transmittal of the International Search Report and the Written Opinion of the International Searching Authority, or the Declaration; International Search Report and Written Opinion for International Application No. PCT/US2011/028138, Oct. 26, 2011, 9 pgs.

European Patent Office, Supplementary European Search Report and European Search Opinion, App. 11756764.4/EP2548138, 7 pages, Sep. 26, 2013.

\* cited by examiner

US 9,058,353 B2

COMPUTER RELATIONAL DATABASE METHOD AND SYSTEM HAVING ROLE BASED ACCESS CONTROL

RELATED APPLICATION

This application is a national stage application under 35 U.S.C. §371 of International Application No. PCT/US2011/028138, filed Mar. 11, 2011, which claims priority to and the benefit under 35 U.S.C. §119(e) of U.S. Provisional Application No. 61/313,951, filed on Mar. 15, 2010, which applications are all incorporated by reference into the present disclosure in their entirety.

The entire teachings of the above application(s) are incorporated herein by reference.

BACKGROUND OF THE INVENTION

This disclosure details the algorithms and structures used to implement a role based access control system to secure data stored in a relational data model or in one or more databases.

Generally in the state of the art, relational database systems only provide security at object/operation level. For example, it is possible to configure which users can read or modify a table, view or store procedure. It is also possible in more advanced database systems to control row level access using views to control access to the data (using role membership functions provided by the database system) and a model to store the association of data labels to roles that can be used to filter the data presented by the view. Those mechanisms present the following problems:

(1) The user or group accessing the database needs to be configured in the database system.

(2) The database system must have physical access to the security store (i.e. LDAP) in order to resolve user group memberships and the state of the account (enabled/disabled).

(3) The identity of the user must be used with or upon connection to the database.

(4) Authentication of users on multi layer systems requires delegation of credentials which is not universally available.

(5) Authenticating every user in the database server prevents the usage of connection pools and therefore degrades performance.

(6) Forcing the database to resolve users, groups and role memberships degrades performance.

(7) Changes on the security roles, requires modification of database objects (i.e. views or store procedures).

SUMMARY OF THE INVENTION

The present invention addresses the disadvantages of the prior art. Embodiments provide a solution that decouples object and row level security from the database system. That is, embodiments control access to data in database objects at both row and column levels of the database tables. One can control if a user can see (access) a database table and then control what data from inside the table that the user can see (access), at the row level as well as the column level, i.e., fields in the table. Restated, a subview of the table is effectively defined for user access and security purposes.

The high level process of embodiments of the present invention is as follows:

1. A user submits a query to a target relational model via the repository.

2. The repository intercepts the query and identifies the user.

3. The user name can be provided as additional information in order to support delegation.

4. The query is parsed in order to identify which database objects are to be accessed by the query.

5. The repository looks up security information of the entities (objects) to be accessed in the MetaModel and resolves any group memberships stored in the authorization store (i.e. LDAP).

6. The repository either allows or disallows access to the objects/entities before even reaching the target database.

7. If access is allowed, the repository modifies the query before it is submitted to the relational model (target database) such that information for which the user is denied access (i.e., unauthorized or ineligible to access) is filtered out, for example using a SQL where clause. The SQL where clause filters at the row level of a database table.

Thus the security rules for access are defined horizontally (by database table rows) and vertically (by database table columns), and the modified query filters the data request horizontally (by database table rows) and vertically (by database table columns).

The security configuration information is stored as data that qualify which data is accessible by certain role/task using a rich expression system. This information is also secured by the repository itself and therefore makes the security system dynamically adjustable at runtime.

In one embodiment, a method and/or system of controlling access to secured data in a database comprises:
 operatively coupling a repository to one or more databases storing secure data;
 configuring and employing the repository to intercept a user query of one of the databases;
 the repository being executable by a processor and the processor automatically determining from the intercepted query a user who generated the user query and a user role assigned to the user;
 based on determined user role, the processor automatically modifying the user query to filter out secure data for which the user does not have access rights (is ineligible or not allowed access); and
 applying the modified query to the one database to retrieve qualifying data (as authorized by user role).

Embodiments parse the intercepted query and identify objects in the subject database that are to be accessed as part of the user query. The user query may include an indication of the user. And the repository is further configured to look up security information of the identified objects in a metamodel of the database, and resolve any group memberships.

In accordance with the principles of the present invention, embodiments store in the metamodel of the database security information that qualifies which data objects are accessible by certain user roles. The repository is further configured to look up security information of the identified objects in the metamodel and determine which identified objects to filter out of the user query. For example, the repository is configured to look through pertinent tables, subtables, columns, rows and elements, as defined and related in the metamodel, for security information of the identified objects. Embodiments further use the repository to secure the security information. This enables the security information to be dynamically adjustable at runtime.

In some embodiments, the steps of automatically determining and automatically modifying include decoupling object and row level security from the subject database.

At least one of the databases is a relational database in embodiments. The step of automatically modifying the user query includes inserting an SQL where clause to filter out certain secure data objects (table rows) in the subject database that are part of the user query.

Preferably, the databases are unrelated to each other, are disparate and non-centrally managed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
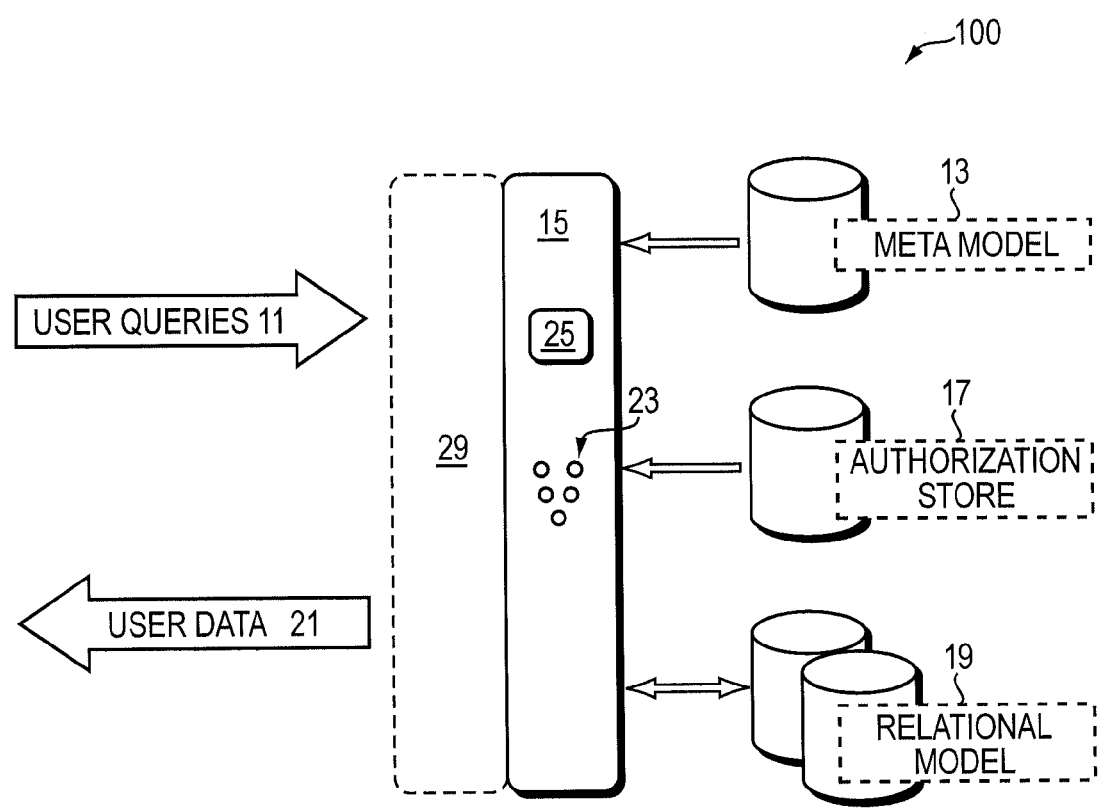
FIG. 1 is a block diagram of an embodiment of the present invention.

The diagram of FIG. 1 represents the components of one embodiment of the present invention. The illustrated system 100 decouples object and row level security from a database system. Embodiment systems 100 operate on or apply to a plurality of databases 19 at one time. The databases in the plurality are unrelated to each other and are non-centrally managed. The components of invention system 100 in one embodiment include: a repository 15 storing models 23 of databases 19 or portions thereof, a web service interface 29 that presents representations of the models 23 to end users, metamodel data 13 and a security system component 17.

The repository 15 comprises: (1) a plurality of models 23 and (2) a model manager 25. The plurality of models 23 includes custom models along with system standard models. Each model 23 is formed of data models representative of a target database 19, business logic, event triggers and functions, security definitions and distribution configurations. Each of these elements that are part of a model 23 can be created, modified, and injected into the model manager 25/repository 15. The model manager 25 manages these elements per model 23 and groups these elements into a model 23.

For a given model 23, its data model defines entities, attributes and relationships, such as tables and sub-tables and organization of the tables/sub-tables of the target database 19. Security configurations can be defined at each logical level (table element, sub-table element, table part or whole, sub-table part or whole). Defining, modifying or updating part of a model 23, injecting new models 23 into the model manager 25/repository 15 or updating old ones is a simple configuration task in system 100 that requires no coding or compilation, and can be performed while an instance of repository 15 is running. For each model 23, the system 100 defines in model manager 25/repository 15 the model's data and business logic and specifies in model manager 25 the model's security, event and distribution configurations. This enables the model manager 25 and repository 15 to govern who, when and where business logic is executed and data is accessed.

In one embodiment, the governance structure of repository 15 can tailor and control how services are provided and customized for specific users, groups and organizations. By services, Applicant's refer to virtual machines, desk tops, physical servers, and in general any infrastructure, platform or software managed by the system 100 within a private or public cloud.

Repository's 15 governance structure controls the aspects of a custom solution that integrates with an external database/relational model 19 system. In particular, Repository's 15 governance controls:
the creation, access and modification of existing or new data, either inside repository 15 or using an external database or system;
the definition of custom business logic that is executed in a distributed scalable environment;
the configuration of the rules that specify when the business logic is executed; and
the configuration of the rules that specify where the business logic is executed.

A new data model (at 23) can be defined in two ways:
(i) connecting to an existing external database 19 and selecting the subset of the data or the entire database 19.
(ii) creating new data from scratch specifying new entities, attributes and relationships.

The data model and corresponding model 23 can then be injected into the model manager 25 and repository 15, and in turn the model manager 25 automatically generates a REST interface 29 (or the like web service interface). Unlike a typical REST interface 29 that exposes the entire contents of a URI (Uniform Resource Identifier, identifying a resource on the Internet), the system 100 automatically generated REST interface 29 exposes only selected parts to the data using access permissions, rules and filters that can easily support complex conditions. This is accomplished without writing specific or dedicated code. The data from external systems 19 or from new models 23 can be read, modified, and deleted by users using the REST interface 29 and governance structure of repository 15.

Of particular interest and advantage, system 100 provides controlled user access to secured data in database systems 19. System 100 decouples object and row level security from the database system 19. In particular, system 100 controls access to data in database objects at both the table row level and table column level. System 100 enables one to control if a user can see (access) a database table and then control what data from inside the table that the user can see (access), at the row level as well as the column level. This means system 100 can control data access to specific individual fields in a table and effectively defines a subview of the table. In a high level overview, operation of invention system 100 with respect to controlled access is as follows.

First a user submits a query 11 to a target relational model 19 via repository 15. In response, the repository 15 intercepts the input query 11 and identifies the submitting user. The user name can be provided as additional information in the query 11 in order to support delegation.

Next, repository 15 parses the query 11 and identifies which database objects or entities are to be accessed by the query 11. The repository 15 looks up in MetaModel 13 the security information of the database entities to be accessed and resolves any group memberships stored in the authorization store (i.e. LDAP) 17. As a result, the repository 15 either allows or disallows access to the database objects/entities before even reaching the database 19 (i.e., before the query 11 reaches the relational model 19).

If any level of access is allowed, the repository 15 modifies the query before it is submitted to the relational model 19 such that the data objects for which the user is denied access (is unauthorized) are filtered out, for example using a SQL where clause. The SQL where clause filters at the row level of a database table. As a consequence, a modified query is applied to relational model 19.

Thus the rules for access are defined horizontally (by database table rows) and vertically (by database table columns), and the data passed back via the REST call is filtered horizontally (by database table rows) and vertically (by database table columns).

In MetaModel 13, the security configuration information is stored as data that qualify which database 19 object(s) is accessible by certain user role/task. This information is also secured by the repository 15 itself (in models 23) making the invention security system 100 dynamically adjustable at runtime.

Relational Models 19

A plurality of relational data models 19 is hosted in a storage system that includes a query language capable of processing queries with conditional statements support. An example of (but not limited to) such a storage system is a relational database with support for primary and foreign keys, join statements and where clauses. Generally, the relational models/databases 19 in the plurality are not related to each other, are disparate and non-centrally managed.

Each relational model 19 in the storage system includes relationships and entities in a standard machine readable format. This machine readable information is MetaModel 13 and includes a full description of all of the database entities that are used to store data, including the type information of the data stored, and the relationships between all the entities.

Figure 2:
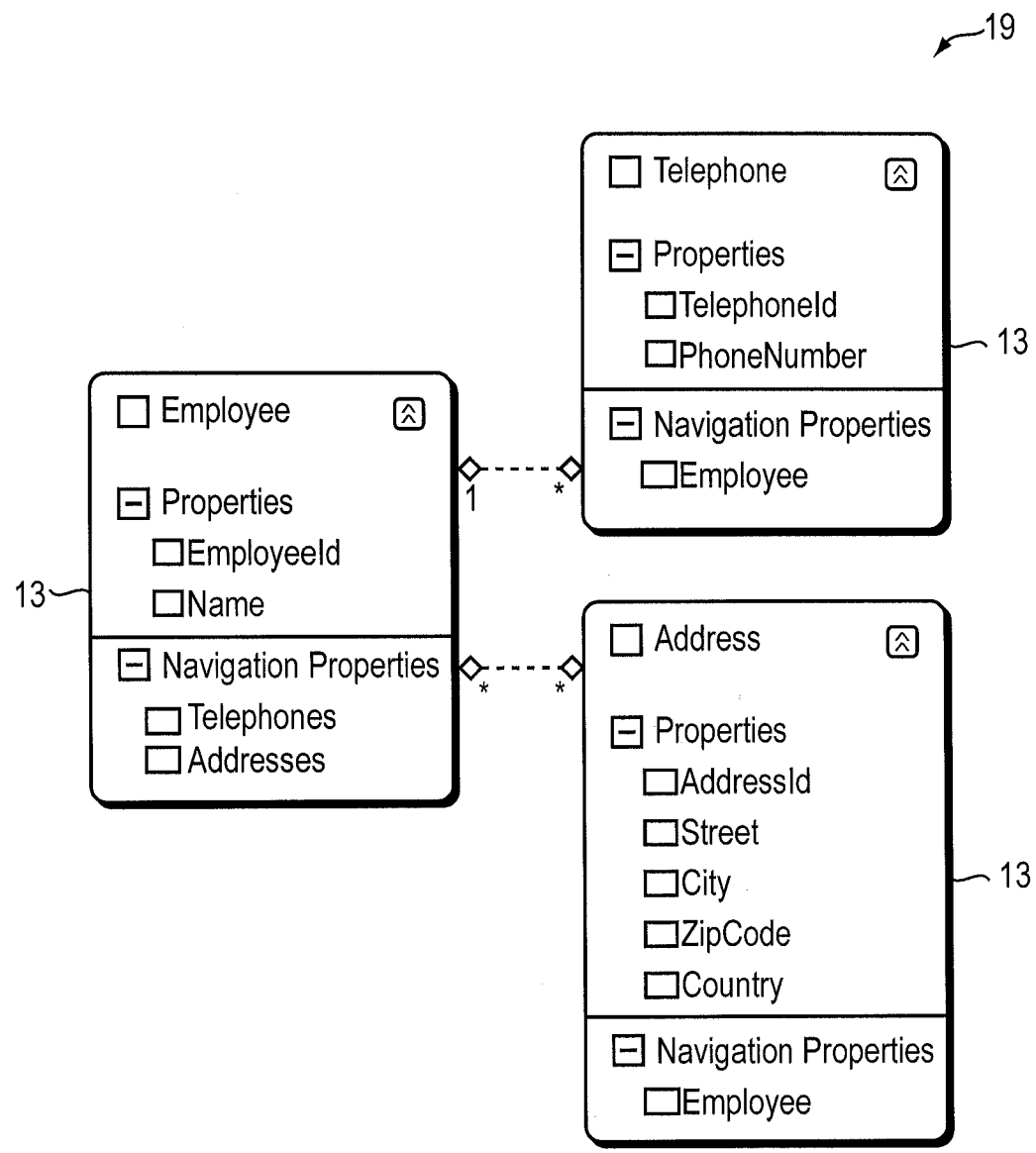
FIG. 2 is a schematic view of the relational data model and corresponding metadata (i.e., metamodel) in embodiments.

An example of a relational data model 19 and corresponding XML metadata 13 (machine readable) is illustrated in FIG. 2 and itemized as follows:

```
<model>
  <entities>
    <entity name="Address">
      <properties name="AddressId" key="true"/>
      <properties name="Street"/>
      <properties name="City"/>
      <properties name="ZipCode"/>
      <properties name="Country"/>
    </entity>
    <entity name="Employee">
      <properties name="EmployeeId" key="true"/>
      <properties name="Name"/>
    </entity>
    <entity name="Telephone">
      <properties name="TelephoneId" key="true"/>
      <properties name="PhoneNumber"/>
    </entity>
  </entities>
  <relationships>
    <relationship>
      <end name="Address" multiplicity="*"/>
      <end name="Employee" multiplicity="*"/>
    </relationship>
    <relationship>
      <end name="Telephone" multiplicity="*"/>
      <end name="Employee" multiplicity="1"/>
    </relationship>
  </relationships>
</model>
```

The metamodel 13 data provides the data models of models 23.

Role Based Security System 17

The declarative role based security system 17 is formed of two main subsystems: a data subsystem and a security runtime subsystem.

The Data subsystem is a relational model used to store security access rules of the target relational model 19. The security system 17 uses hierarchical structures in order to maximize the expressiveness of the system and thus minimize repetition of information when representing complex relationships between the access control rules and different user roles of the target model 19. The rules for access are defined horizontally (by relational model 19 rows) and vertically (by relational model 19 columns), and thus the data passed back via the REST call is filtered horizontally (relational model 19 rows) and vertically (relational model 19 columns).

The security runtime subsystem is a set of algorithms used to determine the access control rules that apply to a particular user, and to filter data not accessible to that user. The security runtime intercepts any queries 11 to the storage system of the target relational model 19, it then modifies the queries such that unauthorized data (i.e., data not authorized to be accessible to the user) is filtered out.

Figure 3:
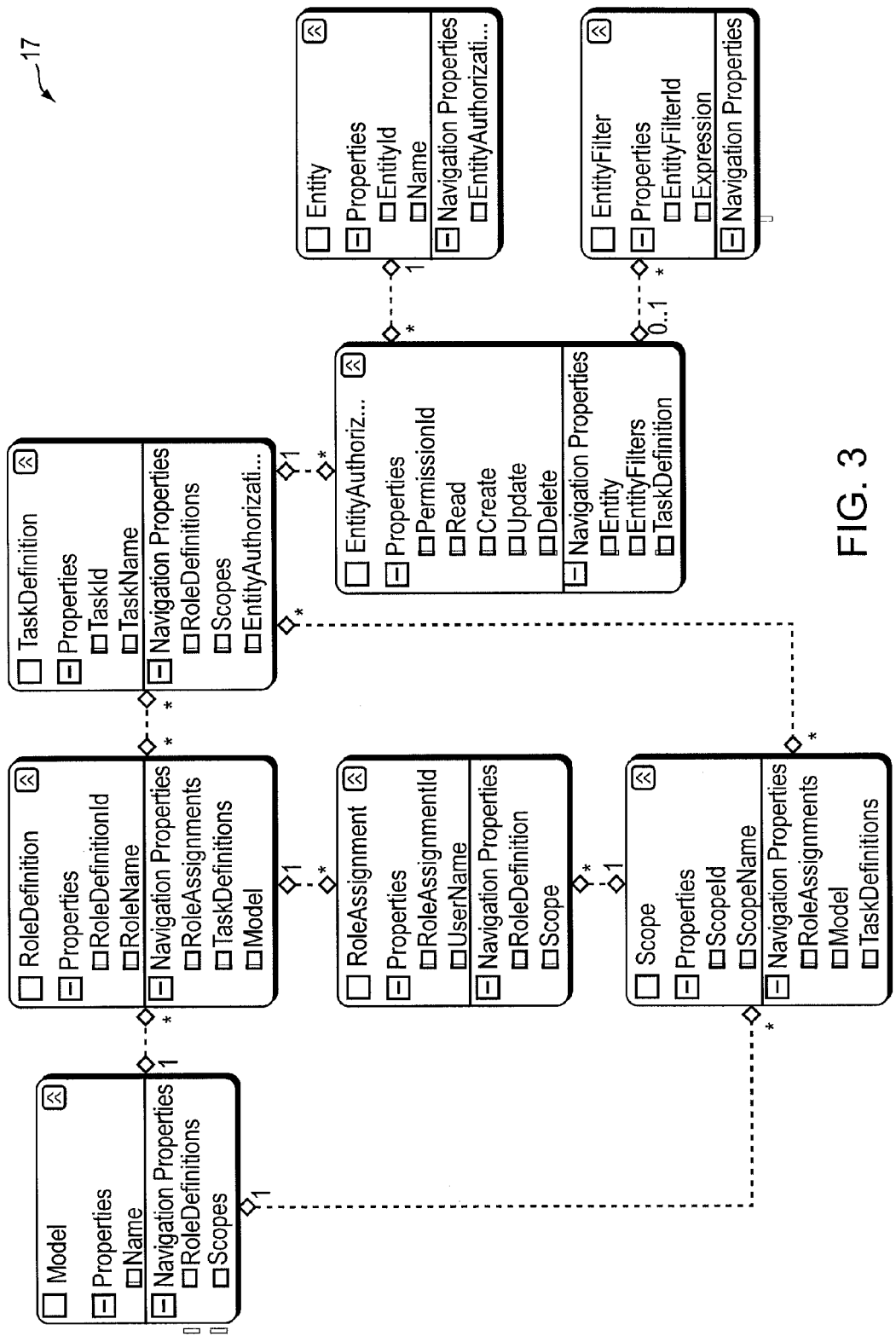
FIG. 3 is a schematic view of the role-based security information of the metamodel in embodiments.

In one embodiment, the role based security information 17 is stored using the relational model illustrated in FIG. 3. In FIG. 3, Model: represents a target relational model 19 to be secured.

Entity: represents an entity in the target model 19.

EntityAuthorization: represent an access rule associated to an entity, for example read access to the entity.

EntityFilter: is a set of conditional statements over the data of a target entity and its relationships. For example "Employee.Addresses.City=London"

Scope: is a bit of information that can be used to group a set of entities in the target model 19. The data in a scope can be used to uniquely identify the entities that belong to that scope. For example, a scope could be the name of a city, say London, then all of the addresses in London, employees who live in London and all London phone numbers can be uniquely identified as part of the scope.

RoleAssigment: represents the role of a user in a particular scope.

RoleDefinition: represents a role within the system, for example, users, administrators, visitors.

TaskDefinition: represents a set of tasks associated to a role.

Model manager 25 uses the foregoing as the security configuration of a model 23 stored in repository 15. Then, in processing user queries 11, Repository 15 looks to model 23 definitions as made clear below. Also in accordance with the model 23 definitions, model manager 25 generates the code to produce a pertinent representation of target database 19 in REST or web service interface 29.

The following example illustrates the sequence of events processed by invention system 100 in one embodiment.

1. A query 11 is submitted by a user and intercepted by the security runtime subsystem (of 17) in the form of an expression tree.

"SELECT Employee.Name, Telephone.PhoneNumber
FROM Employes, Telephones"

2. The security runtime subsystem (at 17) parses the expression tree and identifies which entities in the target model are being accessed as part of the query 11.

Employee, Telephone

3. The security runtime subsystem of 17 builds a list with all the TaskDefinition's in each scope of the user that sent the query 11.

Scope=London
Role Definition=User
Task Definition=List Employee Phones
Role Assignment=Abe, Role=User, Scope=London
EntityAuthorization=Employee (Read=true), Telephone (Read=true)
EntityFilter=Employee.Address.Country=[Scope]
Results in the following table for the user Abe
Scope=London, Task=List Employee Phones 4. The security runtime subsystem of 17 accesses a lookup table (a file in metamodel 13) with all of the access rules and filters (EntityAuthorization, EntityFilter) associated to that entity.

Employee: Read, Employee.Country=[Scope]

5. The security runtime (at 17) builds an expression tree to filter the unauthorized data/data not allowed to be accessible to the user using the following algorithm:

a. Generate an expression for each scope/task pair in the list generated in step 3 by doing the following substitutions in each of the expressions found in step 4:

i. [Scope] is substituted by scope name
ii. [Application] is substituted by application name associated to the scope
iii. [UserName] is substituted by the name of the user
iv. A literal value is not modified.
v. If no expression is associated to the EntityAuthorization then a constant "True" Boolean expression is generated.

b. The total number of expressions is equal to the total number of rows in step 3 multiplied by the number of expressions resulting from step 4.

c. All expressions associated to the same EntityAuthorization are concatenated into a single expression using the OR expression.

d. The resulting single expressions from different EntityAuthorizations resulting from the previous step are concatenated into a single expression using the AND expression.

Employee.Country=London

6. The security runtime subsystem (at 17) appends the expression built in the previous step to the conditional part of the intercepted query 11. If the query 11 does not support a conditional part, then the expression is evaluated to each of the target model (database) entities affected (e.g., Create).

"SELECT Employee.Name, Telephone.PhoneNumber
FROM Employes, Telephones WHERE
Employee.Address.Country=London"

7. The modified query 11 is sent for processing and subsequently query results data 21 are returned to the user.

As a result, the security runtime system 17 applies the security restrictions, as stored in metamodel 13, defined for the user by assigned user roles, by different people at different data levels (tables, subtables, rows, columns, entities) of model 23 relating to target database 19. Security runtime looks at each data level and applies security restrictions (the rules in the security data subsystem) as pertinent in modifying the query 11. This causes the data passed back via the REST call to be filtered horizontally (by target database 19 table rows) and vertically (by target database 19 table columns).

In this way, invention system 100 controls access to data in database objects at both the row level and the column level of database tables. Advantageously, one can control if a user/user role can access a database table and what data from inside the table that the user can access, at the database table row level as well as at the column level and hence fields of the table. This means that a subview of the table is defined for user access and security purposes.

Accordingly, the invention system 100 automates low level code generation using a declarative approach. Definitions of business processes, triggering events and corresponding data model (target databases), and organizational rules for the data (actions and operations) are declared. In accordance with these declarations, a runtime engine of system 100 compiles and generates low level code on the fly and interjects such code into the system 100 and computer network thereof.

Thus the present invention system 100 provides a declarative distributed event system for relational data models 19. Moreover, the present invention presents a resource and data centric, global computer network (i.e., Internet) scale architecture. Declarative, distributed events systems of the present invention are capable of operation across a computer network, and allow for adapting to, preserving and having no limits on canonical styles of target database. The declarative approach of Applicant's invention allows one to describe what the system should do as opposed to how the system should do it. Such advantages are not achieved by the prior art.

Figure 4:
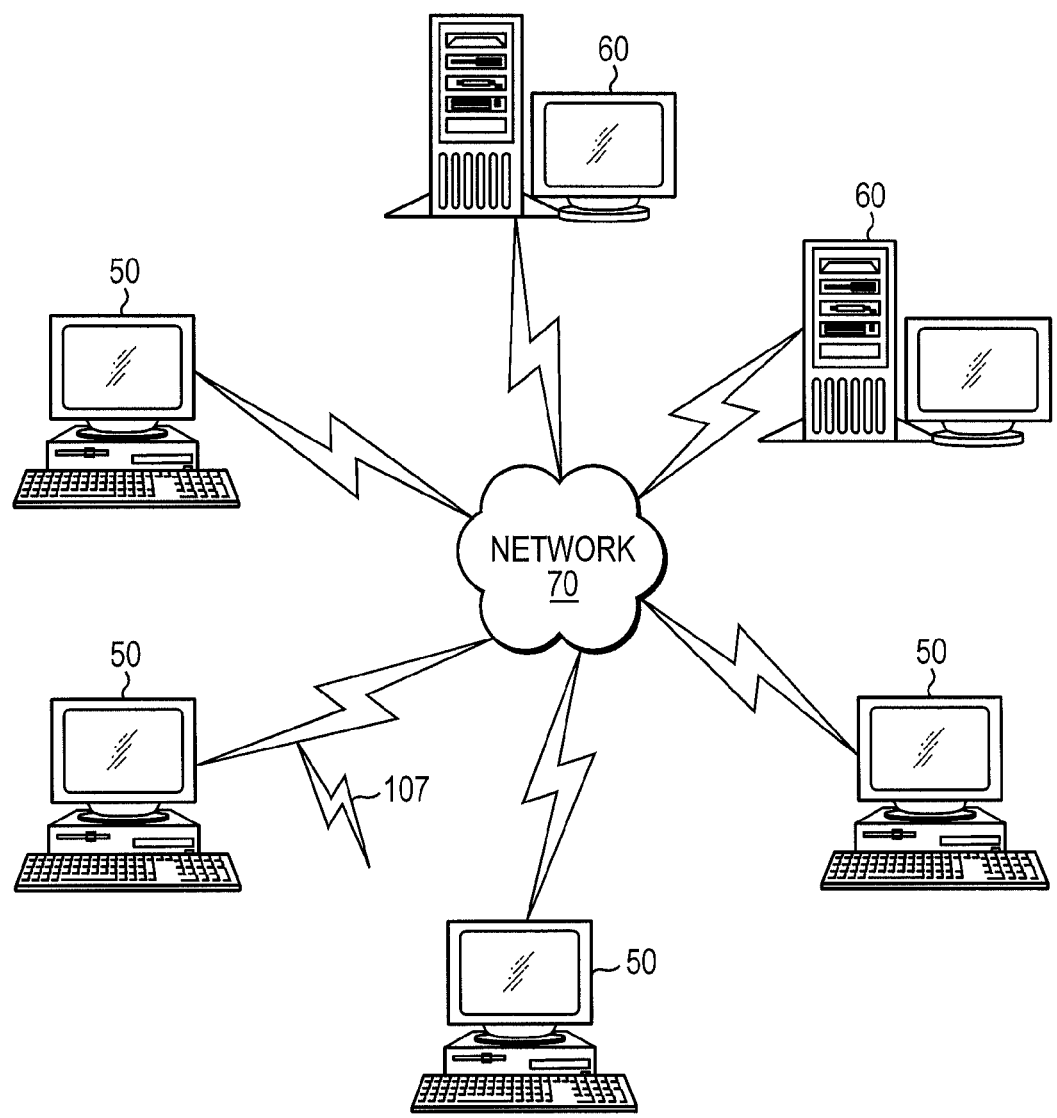
FIG. 4 is a schematic view of a computer network embodying the present invention.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
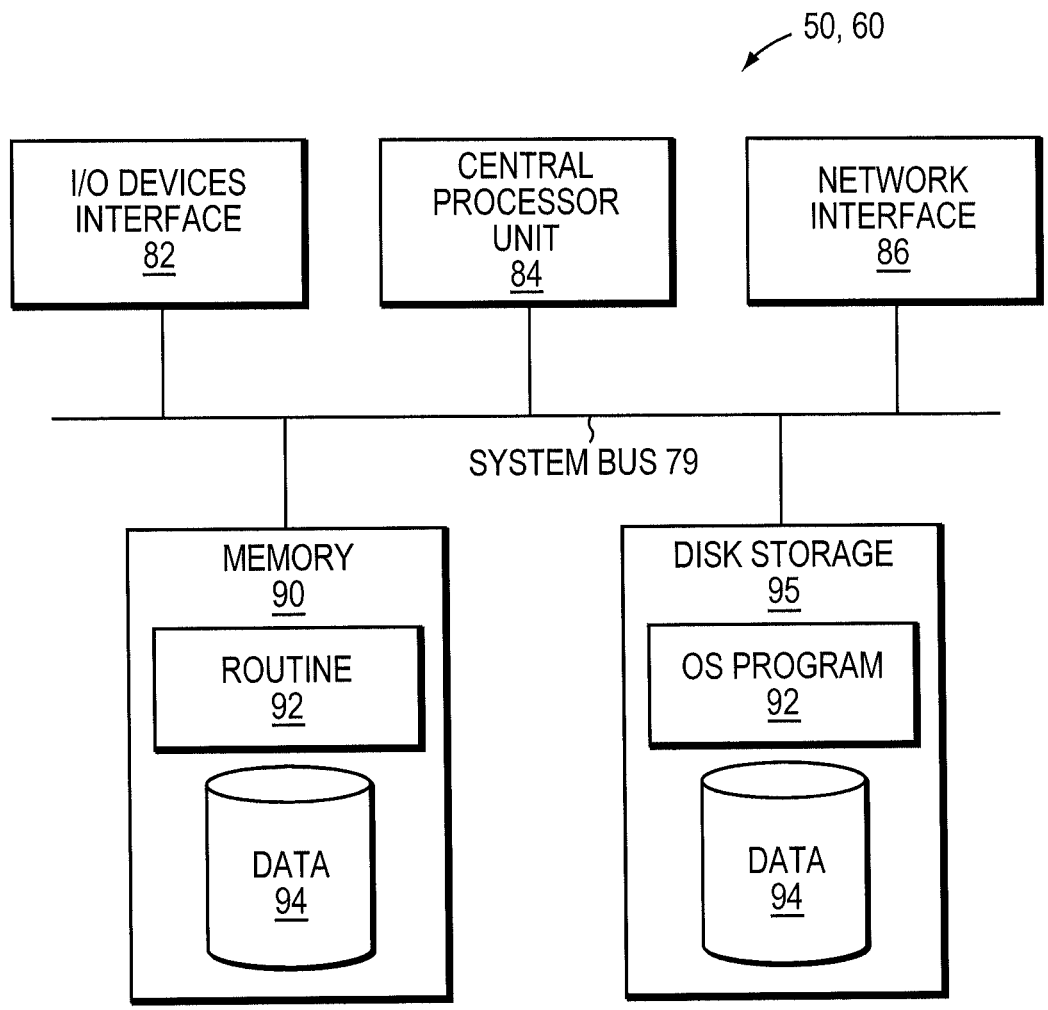
FIG. 5 is a block diagram of a computer node in the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., repository 15, model manager 25, security runtime subsystem of 17 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling access to secured data, comprising:
    operatively coupling a repository to one or more databases storing secure data;
    storing, in a metamodel of the one or more databases, security information that qualifies which data objects are accessible by certain roles;
    employing the repository:
    intercepting a user query of one database of the one or more databases;
    automatically determining from the intercepted query, a user who generated the user query and a user role assigned to the user;
    parsing the intercepted query and identifying objects in the one database that are to be accessed as part of the user query;
    looking up security information of the identified objects in the metamodel and determine which identified objects to filter out of the user query;
    based on the determined user role and the identified objects to be filtered out of the user query, automatically building an expression tree to filter out secure data for which the user does not have access rights and modifying the user query by appending the expression tree to the user query to filter out secure data for which the user does not have access rights; and
    applying the modified query to the one database;
    using the repository to secure the security information in a database model; and
    enabling the security information to be dynamically adjustable at runtime.

2. A method of claim 1 wherein the user query includes an indication of the user; and the repository is further configured to look up security information of the identified objects in a metamodel of the one database, and resolve any group memberships.

3. A method of claim 1 wherein the steps of automatically determining and automatically modifying include decoupling objects and row level security from the one database.

4. A method of claim 1 further comprising processing the modified query on the one database and returning results of the modified query to the user.

5. A method of claim 1 wherein the one database is a relational database.

6. A method of claim 5 wherein the step of automatically modifying the user query includes inserting an SQL Where clause to filter out certain secure data/objects in the one database that are part of the user query.

7. A method as claimed in claim 1 wherein the one or more databases are unrelated to each other and non-centrally managed.

8. A computer system of controlling access to secured data, comprising:
    a repository operatively coupled to one or more databases storing secure data, the repository configured to intercept a user query of one database of the one or more databases;
    a metamodel of the one database, the metamodel being configured to store security information that qualifies which data entities are accessible by certain user roles; and
    a security runtime subsystem of the repository configures to automatically determine from the intercepted query a user who generated the user query and a user role assigned to the user;
    parse the intercepted query and identifying entities in the one database that are to be accessed as part of the user query;
    look up security information of the identified entities in the metamodel to determine which identified entities to filter out of the user query;
    based on the determined user role and identified entities to be filtered out in the user query, automatically building an expression tree to filter out secure data for which the user does not have access rights and modifying the user query by appending the expression tree to the user query to filter out secure data for which the user is ineligible to access;
    the repository applying the modified query to the one database and retrieving qualifying data as authorized by the user role;
    wherein the repository is configured to secure the security information in a database model, and to enable the security information in the database model to be dynamically adjustable at runtime.

9. A computer system as claimed in claim 8 wherein the user query includes an indication of the user; and the repository is further configured to look up security information of the identified entities in a metamodel of the one database, and resolve any group memberships.

10. A computer system as claimed in claim 8 wherein the security runtime subsystem is configured to decouple object level security and row level security from the one database.

11. A computer system as claimed in claim 8 wherein the repository further returns results to the user of the modified query as applied to the one database.

12. A computer system as claimed in claim 8 wherein the one database is a relational database.

13. A computer system as claimed in claim 12 wherein the security runtime subsystem automatically modifying the user query includes inserting an SQL where clause to filter out the secure data for which the user is ineligible to access but are part of the user query.

14. A computer system as claimed in claim 8 wherein the one or more databases are unrelated to each other and are non-centrally managed.

15. A non-transitory computer readable storage medium having a computer readable program embodied therein that when executed causes a computing system to perform a method of controlling access to secured data, wherein the method comprises:

operatively coupling a repository to a plurality of databases storing secure data;

storing, in a metamodel of the plurality of databases, security information that qualifies which data objects are accessible by certain roles;

employing the repository:

intercepting a user query of one database of the plurality of databases;

automatically determining from the intercepted query, a user who generated the user query and a user role assigned to the user;

parsing the intercepted query and identifying objects in the one database that are to be accessed as part of the user query;

looking up security information of the identified objects in the metamodel and determine which identified objects to filter out of the user query;

based on the determined user role and the identified objects to be filtered out of the user query, automatically building an expression tree to filter out secure data for which the user does not have access rights and modifying the user query by appending the expression tree to the user query to filter out secure data for which the user does not have access rights; and applying the modified query to the one database;

using the repository to secure the security information in a database model; and enabling the security information to be dynamically adjustable at runtime.

16. The non-transitory computer readable storage medium as claimed in claim 15, wherein the one database is a relational database.

* * * * *